United States Patent [19]

Larson

[11] Patent Number: 5,283,307

[45] Date of Patent: Feb. 1, 1994

[54] ORGANOSILOXANE COMPOSITIONS EXHIBITING IMPROVED BONDING TO SUBSTRATES DURING CURING

[75] Inventor: Kent R. Larson, Midland, Mich.

[73] Assignee: Dow Corning Corporation, Midland, Mich.

[21] Appl. No.: 937,006

[22] Filed: Aug. 31, 1992

[51] Int. Cl.$^5$ .................................. C08G 77/06
[52] U.S. Cl. .................................. 528/15; 524/730; 524/264; 524/265; 524/266; 525/474
[58] Field of Search ........... 528/15; 524/730, 264, 524/265, 266; 525/474

[56] References Cited

U.S. PATENT DOCUMENTS

| | | | |
|---|---|---|---|
| 4,087,585 | 5/1978 | Schulz | 428/429 |
| 4,732,932 | 3/1988 | Waldern | 524/826 |
| 4,737,562 | 4/1988 | Chaudhury et al. | 528/15 |
| 4,766,176 | 8/1988 | Lee et al. | 525/478 |
| 4,912,188 | 3/1990 | Colas et al. | 528/15 |

FOREIGN PATENT DOCUMENTS 47-36255  9/1972  Japan .
3-234768 10/1991 Japan .

Primary Examiner—Melvyn I. Marquis
Attorney, Agent, or Firm—Robert Spector

[57] ABSTRACT

Organosiloxane compositions curable by a platinum-catalyzed hydrosilation reaction contain as the adhesion promoter a silane comprising an silicon-bonded alkenyl radical containing at least five carbon atoms and at least one alkoxy group. The silane or a hydrolysis-condensation product thereof is optionally used in combination with a catalyst that promotes reaction of the silane with groups present on the surface of the substrate to which bonding is desired.

5 Claims, No Drawings

ORGANOSILOXANE COMPOSITIONS EXHIBITING IMPROVED BONDING TO SUBSTRATES DURING CURING

BACKGROUND OF THE INVENTION

1. Field of the Invention

This invention relates to curable organosiloxane compositions. More particularly this invention relates to organosiloxane compositions that cure by a platinum-catalyzed hydrosilation reaction and develop strong cohesive bonds to various substrates, particularly aluminum, steel and glass, that the compositions are in contact with during curing.

2. Background Information

Organosiloxane compositions that cure by a hydrosilation reaction between alkenyl hydrocarbon radicals and silicon bonded hydrogen atoms are well known. The curing reaction is typically catalyzed by a metal from the platinum group of the periodic table or a compound of one of these metals, and the consistency of the cured materials range from gels to elastomers to resins. The ability of these compositions to cure at temperatures from ambient to about 200° C. without the evolution of by-products make them desirable for a wide range of end use applications, including fabricated articles and encapsulating materials. A disadvantage that has delayed wider acceptance of this type of organosiloxane composition as coating materials is the relatively poor adhesion to organic and metal substrates developed during curing of the compositions.

Attempts have been made to improve the adhesion of organosiloxane compositions that cure by a platinum-catalyzed hydrosilation reaction by coating the substrate with a primer prior to applying the curable organosiloxane composition or by adding an adhesion promoter to the curable composition. Organosilicon compounds containing a variety of reactive groups have been used as both primers and adhesion promoters for curable organosiloxane compositions. Silanes that have been used for these purposes typically correspond to the formula $ASi(OR)_3$, where R represents a lower alkyl radical. A represents a group capable of reacting with the substrate during curing of the organosiloxane composition, and includes but is not limited to ethylenically unsaturated groups such as vinyl radicals and 3-(meth)acryloxypropyl groups, epoxy-containing groups such as gamma-glycidoxypropyl, aminoalkyl, mercaptoalkyl, isocyanato and alkoxy groups. Organosiloxanes containing at least one of these reactive groups per molecule have also been used as adhesion promoters.

Adhesion promoting organosiloxanes containing two or more types of reactive groups per molecule are described in U.S. Pat. No. 4,912,188, which issued on Mar. 22, 1990; in Japanese Laid Open Patent Application No. 3/234,768; and in U.S. Pat. No. 4,732,932, which issued on Mar. 22, 1988.

Primer compositions and adhesion promoters comprising mixtures or reaction products of two or more organosilicon compounds containing at least one of the reactive groups discussed in the preceding paragraphs are also known. Mixtures of previously known adhesion promoters include the combination of an epoxy-substituted silane and an organosiloxane containing at least one vinyl radical and at least one silicon-bonded hydroxyl group described in U.S. Pat. No. 4,087,585; the combination of a 1,2-bis(trialkoxysilyl)ethane and an organosilicon compound containing at least one hydroxyl group or suitable hydrolyzable precursor and a group that reacts with the 1,2-bis(trialkoxysilyl)ethane or the curable organosiloxane composition, described in U.S. Pat. No. 4,737,562; and liquid vinyl-containing organosiloxanes prepared by the hydrolysis of a mixture of vinyltriethoxysilane and vinyltrichlorosilane in Japanese Laid Open Patent Application No. 72/36,255, published on Sep. 12, 1972.

A variety of catalysts have been used to promote a hydrolysis-condensation reaction involving the alkoxy and/or hydroxyl groups present on the adhesion promoter molecules and reactive groups present on the surface of the substrate. Suitable catalysts include but are not limited to tetraalkyl titanates and chelates such as acetylacetonates derived from metals including but not limited to aluminum, copper and titanium.

A disadvantage of using as adhesion promoters alkoxysilanes or organosiloxanes containing either vinyl or allyl as the silicon-bonded reactive group is the inhibiting effect of these compounds on the platinum-catalyzed hydrosilation reaction used to cure the organosiloxane composition. This inhibition is particularly evident at curing temperatures below about 120° C.

One objective of this invention is to improve the adhesion to a variety of substrates exhibited by organosiloxane compositions that cure by a platinum-catalyzed hydrosilation reaction.

A second objective is to define a class of organosilicon compounds containing at least one silicon-bonded higher alkenyl radical and at least one alkoxy group as the reactive groups. The compounds function as adhesion promoters for organosiloxane compositions curable by a platinum-catalyzed hydrosilation reaction without substantially inhibiting curing of the composition at temperatures below about 150° C.

SUMMARY OF THE INVENTION

The objectives of this invention are achieved by using as the adhesion promoter a silane comprising an silicon-bonded alkenyl radical containing at least five carbon atoms. The silane also contains at least one alkoxy group. In the presence of incidental water and an optional catalyst the silane or a hydrolysis-condensation product thereof reacts with groups present on the surface of the substrate to which bonding is desired.

DETAILED DESCRIPTION OF THE INVENTION

This invention provides a curable organosiloxane composition comprising

A. a polyorganosiloxane containing at least two alkenyl radicals per molecule,

B. an organohydrogensiloxane in an amount sufficient to cure said polyorganosiloxane, C. as the hydrosilation catalyst a metal from the platinum group of the periodic table or a compound thereof, where the concentration of said catalyst is sufficient to promote curing of said composition, and D. as the adhesion promoter for said composition, an organosilicon compound comprising at least one silicon-bonded alkenyl radical containing at least five carbon atoms and at least one silicon-bonded alkoxy group and partial condensation products of said organosilicon compound. The concentration of said adhesion promoter is sufficient to achieve adhesion of said composition to a substrate in contact with said composition during curing thereof.

The characterizing feature of the present composition is the presence as the adhesion promoter of an organosilicon compound selected from the group consisting of silanes represented by the general formula $R^2SiR^3_{-n}(OR^1)_{3-n}$ and condensation products of said silanes, where $R^1$ and $R^3$ represent identical or different alkyl radicals, $R^2$ represents an alkenyl radical containing at least 5 carbon atoms, and n is 0 or 1. Most preferably $R^2$ is a linear, terminally unsaturated hydrocarbon radical containing from 5 to 8 carbon atoms, n is 0 and $R^1$ is lower alkyl containing from 1 to 4 carbon atoms. These preferences are based on the availability of the reactants used to prepare the silane and the efficacy of the silanes as adhesion promoters.

In place of the silane the curable composition can contain partial condensation products resulting from the hydrolysis of at least one alkoxy group present on the initial silane and reaction of the resultant compound with at least one adjacent silane molecule to form siloxane (Si—O—Si) bonds. The ability of the condensation product to effectively function as an adhesion promoter is adversely affected when the average number of silicon atoms present in the condensation product exceeds about 4.

The minimum concentration of the present adhesion promoters that will enable cohesive bonding to be achieved between the cured organosiloxane composition and the substrate is a function of a number of variables including the particular adhesion promoter, type of substrate, curing conditions, and the other ingredients present in the curable organosiloxane composition. The concentration of adhesion promoter will typically be from about 0.01 to about 10 weight percent, preferably from 0.1 to 5 weight percent, based on the total weight of the curable composition.

While not willing to be bound by any theory, it is believed that the adhesion promoter should be at least partially incompatible with the other organosilicon compounds present in the curable organosiloxane composition. This incompatibility will allow a major portion of the adhesion promoter to migrate to the interface between the uncured organosiloxane composition and the substrate where it can most effectively function to bond the organosiloxane composition to the substrate.

The present compositions optionally contain a catalyst to promote the hydrolysis/condensation reaction of the adhesion promoter and a reaction between the alkoxy or other functional groups present on the adhesion promoter and hydroxyl or other reactive groups present on the surface of the substrate that the organosiloxane composition is in contact with during the curing reaction. Catalysts that have been employed in combination with known adhesion promoters include but are not limited to tetraalkyl titanates such as tetra-n-butyl titanate and chelated metal compounds, including the beta-diketonates of metals such as aluminum, copper and titanium.

The concentration of the adhesion promoting catalyst is typically from about 0.1 to about 1 weight percent, based on the weight of the curable organosiloxane composition.

In addition to the adhesion promoter and optional hydrolysis/condensation catalyst the curable compositions of this invention comprise a polyorganosiloxane containing an average of at least two alkenyl radicals per molecule, referred to hereinafter as ingredient A, an organohydrogensiloxane, referred to hereinafter as ingredient B, and a hydrosilation catalyst, referred to hereinafter as ingredient C. Depending upon the type of cured material desired, the composition may also contain at least one reinforcing or non-reinforcing filler.

THE CURABLE POLYORGANOSILOXANE (INGREDIENT A)

Ingredient A of the present compositions is a polyorganosiloxane containing an average of at least two ethylenically unsaturated hydrocarbon radicals per molecule. The viscosity of this ingredient can range from a liquid to a high viscosity gum that will flow only under pressure. Two of the ethylenically unsaturated hydrocarbon radicals present in ingredient A are preferably located at the terminal positions of the molecule in the form of dimethylvinylsiloxy, methylphenylvinylsiloxy or dimethyl-5-hexenylsiloxy groups.

If the curable composition is a liquid or pasty material, the viscosity of ingredient A is preferably from 1 to 500 Pa.s and this ingredient is preferably a polydiorganosiloxane. In addition to diorganosiloxane and terminal triorganosiloxy groups, ingredient A can contain one or more monoorganosiloxane units per molecule, resulting in branching of the polymer molecule. Polymers of this type are described in U.S. Pat. No. 3,284,406 to Nelson, which issued on Nov. 8, 1966.

Alternatively, ingredient A can be a semi-solid polydiorganosiloxane, known in the art as a gum, exhibiting a viscosity of up to 1000 Pa.s or greater at 25 degrees C. Curable compositions containing this type of polydiorganosiloxane are typically prepared by blending the ingredients under high shear using a two- or three roll rubber mill or dough-type mixer.

The silicon-bonded organic groups of ingredient A and the organohydrogensiloxane referred to as ingredient B are monovalent unsubstituted or substituted hydrocarbon radicals containing from 1 up to 20 or more carbon atoms. Halogen atoms are preferred substituents. Preferably these hydrocarbon radicals are lower alkyl, phenyl or a perfluoroalkylethyl radical such as 3,3,3-trifluoropropyl, this preference being based on the availability of the intermediates used to prepare ingredient A and B. Most preferably at least a portion of the repeating units of ingredients A and B contain silicon bonded methyl radicals.

Methods for preparing liquid and gum type polyorganosiloxane that can be used as ingredient A are sufficiently well known that a discussion of these methods is not required in this specification.

THE ORGANOHYDROGENSILOXANE (INGREDIENT B)

Ingredient A is cured by a hydrosilation reaction between the ethylenically unsaturated hydrocarbon radicals of this ingredient and silicon-bonded hydrogen atoms of an organohydrogensiloxane, ingredient B. In a typical curable composition of this invention one or more polydiorganosiloxanes containing an average of at least two ethylenically unsaturated hydrocarbon radicals per molecule react with a relatively low molecular weight, liquid organohydrogensiloxane containing an average of at least three silicon bonded hydrogen atoms per molecule.

Ingredient B can contain from as few as four silicon atoms per molecule up to an average of 20 or more, and preferably exhibits a viscosity of up to 10 Pa.s at 25 degrees C. Ingredient B contains repeating units of the formulae $HSiO_{1.5}$, $RHSiO$ and/or $R_2HSiO_{0.5}$. The molecules of this ingredient may also include one or more monoorganosiloxane, diorganosiloxane, triorganosiloxy and $SiO_{4/2}$ units that do not contain silicon bonded hydrogen atoms. In these formulae R is an unsubstituted or substituted monovalent hydrocarbon radical selected from the same group as defined for ingredient A of the present compositions.

Alternatively, ingredient B can be a cyclic compound containing at least 4 organohydrogensiloxane units of the formula RHSiO or a compound of the formula $HR_2SiO(HRSiO)_aSiR_2H$, where a is at least 1.

Most preferably R is methyl and ingredient B is a linear trimethylsiloxy-terminated polymethylhydrogensiloxane or a dimethylsiloxane/methylhydrogensiloxane copolymer containing an average of from 5 to about 50 repeating units per molecule of which from 30 to 100 percent are methylhydrogensiloxane units.

The molecular weights of ingredients A and B together with the number and distribution of the silicon-bonded hydrogen atoms and ethylenically unsaturated hydrocarbon radicals within these ingredients will determine the location of crosslinks in the cured product, which can range from a glass-like resin to an elastomer to a gel.

To obtain a crosslinked material the sum of the average number of alkenyl radicals per molecule of ingredient A and the average number of silicon-bonded hydrogen atoms in ingredient B must be greater than 2.

The concentration of crosslinks per unit volume of cured organosiloxane composition is often referred to as the "crosslink density" and determines certain physical properties of the cured elastomer, particularly hardness, tensile strength and elongation. The particular combinations of polydiorganosiloxane(s) and curing agent(s) yielding the desired combination of physical properties can readily be determined by routine experimentation with a knowledge of this invention.

The molar ratio of silicon bonded hydrogen atoms in the organohydrogensiloxane to the vinyl or other ethylenically unsaturated hydrocarbon radicals present in ingredient A is a major factor in determining the properties of the elastomer or other cured material obtained from the composition. Because of the difficulty often experienced in achieving a complete reaction between all of the silicon bonded hydrogen atoms and all of the vinyl or other ethylenically unsaturated hydrocarbon radicals present in the reaction mixture, it is desirable to have an stoichiometric excess of one of these species, typically the silicon-bonded hydrogen atoms, in a curable composition.

The presence in the curable organosiloxane composition of polyorganosiloxanes containing the preferred hexenyl radical has been shown to slightly inhibit curing of the composition. This inhibition can be compensated for by increasing the molar ratio of silicon-bonded hydrogen atoms to alkenyl radicals to a minimum of about 2.5. A ratio of about 2.8 silicon bonded hydrogen atoms per vinyl or other ethylenically unsaturated hydrocarbon radical has been found to yield optimum combinations of physical properties and completeness of curing for curable compositions of the type described in the accompanying examples. The preferred ratio for a given composition will be determined at least in part by the average molecular weight of ingredient A and the type of curing agent.

THE PLATINUM-CONTAINING HYDROSILATION CATALYST (INGREDIENT C) AND OPTIONAL INHIBITOR

Hydrosilation reactions are typically conducted in the presence of a catalyst that is a metal from the platinum group of the periodic table or a compound of such a metal. Platinum, rhodium and compounds of these metals have been shown to effectively catalyze hydrosilation reactions.

Platinum compounds such as hexachloroplatinic acid, and particularly complexes of these compounds with relatively low molecular weight vinyl-containing organosiloxane compounds are preferred catalysts because of their high activity and compatibility with the organosiloxane reactants. These complexes are described in U.S. Pat. No. 3,419,593 that issued to David N. Willing on Dec. 31, 1968.

Complexes with low molecular weight organosiloxanes wherein the silicon bonded hydrocarbon radicals are vinyl and either methyl or 3,3,3-trifluoropropyl are particularly preferred because of their ability to catalyze a rapid curing of the elastomer at temperatures of at least about 70 degrees C.

The platinum-containing hydrosilation catalyst can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

Mixtures of the aforementioned ingredients A, B and C may begin to cure at ambient temperature. To obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25° C. Compositions containing these catalysts typically require heating at temperatures of 70° C. or above to cure at a practical rate.

If it desired to increase the pot life of a curable composition under ambient conditions, this can be accomplished using an olefinically substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

Some compositions may begin to cure under ambient conditions even when an inhibitor is present. One way to ensure storage stability is to package the composition in two or more containers and place the hydrosilation catalyst and the organohydrogensiloxane in separate containers. The contents of the containers are combined when it is desired to cure the composition.

If it is desired to prepare one-part organosiloxane compositions having virtually indefinite storage stability at temperature of up to 50° C. or higher, this can be achieved by microencapsulating the platinum-containing hydrosilation catalyst in a thermoplastic or thermosetting polymer. Curable organosiloxane compositions containing microencapsulated hydrosilation catalysts are described in U.S. Pat. No. 4,766,176, which issued on Aug. 23, 1988 and U.S. Pat. No. 5,017,654, which issued on May 21, 1991. The teaching of these patents relating to storage stable one-part organosiloxane compositions is incorporated herein by reference.

The consistency of the present compositions can vary from a flowable liquid to a semi-solid paste to a high consistency gum that will flow only under high shear. In addition to the aforementioned ingredients the compositions can contain other additives including but not limited to reinforcing and non-reinforcing fillers, treating agents for these fillers, pigments, processing aids, stabilizers and flame retardants.

The following examples describe preferred embodiments of the curable compositions and should not be interpreted as limiting the scope of the accompanying claims. Unless otherwise specified all parts and percentages in the examples are by weight and viscosities were measured at 25° C.

EXAMPLE 1

This example demonstrates the ability of the present compositions to develop cohesive bonding to substrates under ambient conditions.

A curable composition of this invention was prepared by blending the following ingredients to homogeneity:

76 parts of a dimethylvinylsiloxy terminated polydimethylsiloxane having a viscosity of about 2.1 Pa.s at 25 degrees C.;

24.7 parts of a fume silica having a nominal surface area of 250 m² per gram that had been treated with 1.9 parts of water and 6.1 parts of hexamethyldisilazane;

1.2 parts of a trimethylsiloxy-terminated polyorganosiloxane copolymer having an average of five methylhydrogensiloxane units and three dimethylsiloxane units per molecule with a silicon-bonded hydrogen atom content in the range from about 0.7 to 0.8 weight percent;

1 part of 5-hexenyltrimethoxysilane;

0.9 part of a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent;

0.5 part tetrabutyltitanate; and 0.2 part of cyclic methylvinylsiloxanes.

The resultant composition of this invention was coated on an aluminum sheet and allowed to remain for 3 days under ambient conditions. The cured elastomer that formed during this period was cohesively bonded to the aluminum panel.

For comparative purposes a curable organosiloxane composition outside the scope of the present invention was prepared using the same types and amounts of ingredients as the composition described in the preceding section of this example, with the exception that the 5-hexenyltrimethoxysilane was replaced with an equal weight of vinyltrimethoxysilane. A coating of the resultant composition on an aluminum sheet did not cure after 3 days under ambient conditions.

EXAMPLE 2

This example describes a preferred curable composition of this invention and demonstrates its adhesion to aluminum and glass substrates following curing at a range of temperatures from 25° to 137° C.

Curable compositions were prepared by blending the following ingredients to homogeneity:

49 parts of a dimethylvinylsiloxy terminated polydimethylsiloxane having a viscosity of about 2.1 Pa.s at 25° C., 46.5 parts of finely divided quartz, 3 parts of a trimethylsiloxy-terminated polydiorganosiloxane containing an average of five methylhydrogensiloxane units and three dimethylsiloxane units per molecule with a silicon-bonded hydrogen atom content in the range from about 0.7 to 0.8 weight percent, 0.1 part of a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent, 0.06 part of cyclic methylvinylsiloxanes as a platinum catalyst inhibitor, 0.45 part of zinc oxide, 0.25 part of carbon black, 0 or 1.0 part of 5-hexenyltrimethoxysilane (HTMS) and 0 or 0.5 part of tetrabutyl titanate (TBT)

The molar ratio of silicon-bonded hydrogen atoms to vinyl radicals was 2.77.

The compositions were coated as a 0.25 to 1.5 mm-thick layer on aluminum and glass panels.

The following conditions were used to cure the compositions:

16 hours at 25° C., 1 hour at 50° C., 15 minutes at 80° C. or 15 minutes at 137° C.

Following curing the coated substrates were allowed to remain at 25° C. for 7 days, at which time the adhesion of the cured composition to the substrate was determined by lifting a section of the composition from the substrate using a knife blade, manually grasping the lifted section and pulling the remainder of the coating away from the substrate. If more than half the area of the substrate had cured composition adhering to it the failure was rated "cohesive". Otherwise it was rated "adhesive".

When more than one sample cured at a given temperature exhibited cohesive failure (C) or all exhibited adhesive failure (A), Table 1 contains a ranking of these samples. The rankings for cohesive failure are based on the percentage of the substrate covered with cured material following removal of the coating. Samples exhibiting adhesive failure are not listed unless all of the samples exhibited this type of failure.

TABLE 1

| Sample | HTMS | TBT | Glass Cure Temp (°C.) | Failure |
|---|---|---|---|---|
| 1 | Yes | No | 25 | C |
| 2c | No | No | | C |
| Ranking: 1 > 2c | | | | |
| 3 | Yes | No | 50 | C |
| 4 | Yes | No | 80 | C |
| 5c | No | No | | C |
| Ranking: 4 > 5c | | | | |
| 6 | Yes | No | 137 | C |

TABLE 1-continued

| 7 | Yes | Yes | | C |
|---|---|---|---|---|
| 8c | No | No | | C |
| Ranking: 6 > 7 > 8c | | | | |

| | Aluminum | | | |
|---|---|---|---|---|
| Sample | HTMS | TBT | Cure Temp (°C.) | |
| 9 | Yes | No | 25 | A |
| 10 | Yes | Yes | | A |
| 11c | No | No | | A |
| 12c | No | Yes | | A |
| Ranking: 9, 11c > 10, 12c | | | | |
| All samples exhibited adhesive failure | | | 50 | |
| 13 | Yes | No | 80 | A |
| 14 | Yes | Yes | | A |
| 15c | No | No | | A |
| 16c | No | Yes | | A |
| Ranking: 13 > 14 > 15c, 16c | | | | |
| 17 | Yes | No | 137 | C |
| 18 | Yes | Yes | | C |
| Ranking: 17 > 18 | | | | |
| 17 | Yes | No | 137 | C |
| 18 | Yes | Yes | | C |
| Ranking: 17 > 18 | | | | |

EXAMPLE 3

This example demonstrates the ability of an adhesion promoter of this invention to be used in combination with other known adhesion promoters without the cure inhibition obtained using the corresponding vinyl-substituted silane.

A two-part curable composition of this invention was prepared by blending the following ingredients to homogeneity:

PART A 52 parts of a dimethylvinylsiloxy-terminated polydimethylsiloxane having a viscosity of about 0.4 Pa.s at 25° C.;

46 parts of finely divided quartz exhibiting an average particle size of 5 microns;

2 parts 3-glycidoxypropyltrimethoxysilane;

1 part of 5-hexenyltrimethoxysilane 0.9 part of zinc oxide;

0.5 part of carbon black; and 0.2 part of a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent.

0.6 part of a trimethylsiloxy-terminated organosiloxane copolymer containing an average of five methylhydrogensiloxane units and three dimethylsiloxane units with a silicon-bonded hydrogen atom content in the range from about 0.7 to 0.8 weight percent;

0.01 part of cyclic methylvinylsiloxanes; and 0.01 part of aluminum acetylacetonate.

For purposes of comparison a two-part composition outside the scope of the present invention was prepared using the same types and amounts of ingredients described in the preceding section of this example, with the exception that the hexenyltrimethoxysilane was replaced with an equal weight of vinyltrimethoxysilane.

Parts A and B of both compositions were aged for 15 days at 60° C. Two curable compositions were prepared by combining the two parts of each composition and blending the resultant mixture to homogeneity. The compositions were then coated on sheets of a polysulfone resin and the coated substrates were heated at 150° C. for 15 minutes.

The composition of this invention cured to an elastomer that exhibited cohesive failure when sufficient force was applied to pull the elastomer away from the substrate. The comparative composition containing the vinyltrimethoxysilane did not cure during the heating cycle.

That which is claimed is:

1. A curable organosiloxane composition comprising
   A. a polyorganosiloxane containing at least two alkenyl radicals per molecule,
   B. an organohydrogensiloxane in an amount sufficient to cure said polyorganosiloxane,
   C. a platinum-containing hydrosilation catalyst in an amount sufficient to promote curing of said composition, and
   D. an adhesion promoting additive selected from the group consisting of silanes represented by the general formula $R^2SiR^3{}_n(OR^1)_{3-n}$ and condensation products of said silanes, where $R^1$ and $R^3$ represent identical or different alkyl radicals, $R^2$ represents an alkenyl radical containing at least 5 carbon atoms, and n is 0 or 1.

2. A composition according to claim 1 where n is 0, $R^2$ is $CH_2=CH(CH_2)_p-$, p is an integer with a value of at least 3, the concentration of said adhesion promoter is sufficient to achieve adhesion of said composition to a substrate in contact with said composition during curing thereof, said composition contains an effective amount of a hydrolysis-condensation catalyst for said hydrolyzable silanes, and the silicon-bonded organic groups present in said polyorganosiloxane and said organohydrogensiloxane are monovalent unsubstituted or substituted hydrocarbon radicals containing from 1 up to 20 carbon atoms.

3. A composition according to claim 2 where
   R1 contains from 1 to 4 carbon atoms;
   said monovalent hydrocarbon radicals are lower alkyl, phenyl or 3,3,3-trifluoropropyl;
   the hydrolysis-condensation catalyst is selected from the group consisting of tetraalkyl titanates and chelated compounds of aluminum, copper and titanium;
   at least a portion of said silicon-bonded organic groups are methyl and any remainder are phenyl or 3,3,3-trifluoropropyl; and
   said composition contains a resinous organosiloxane copolymer consisting essentially of triorganosiloxy and $SiO_{4/2}$ units where the silicon-bonded organic groups are monovalent hydrocarbon radicals.

4. A composition according to claim 1 where said composition is packaged in at least 2 containers, with said hydrosilation catalyst and said organohydrogensiloxane being located in separate containers.

5. A composition according to claim 1 where said hydrosilation catalyst is microencapsulated within a layer of a thermoplastic or thermosetting resin.

* * * * *